W. E. FISCHER.
TAKE-UP MECHANISM FOR LOOMS.
APPLICATION FILED MAR. 11, 1908.
931,745.
Patented Aug. 24, 1909.
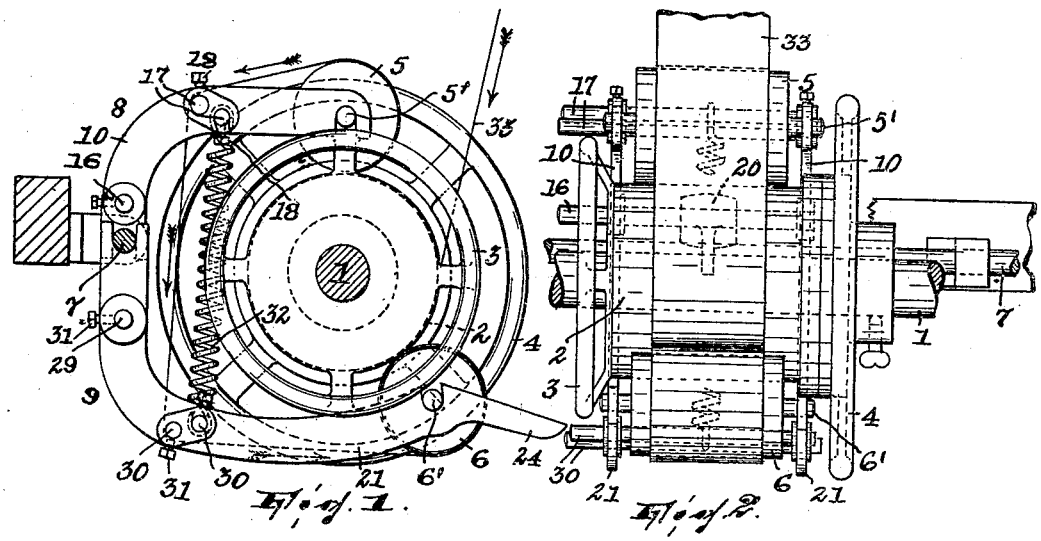
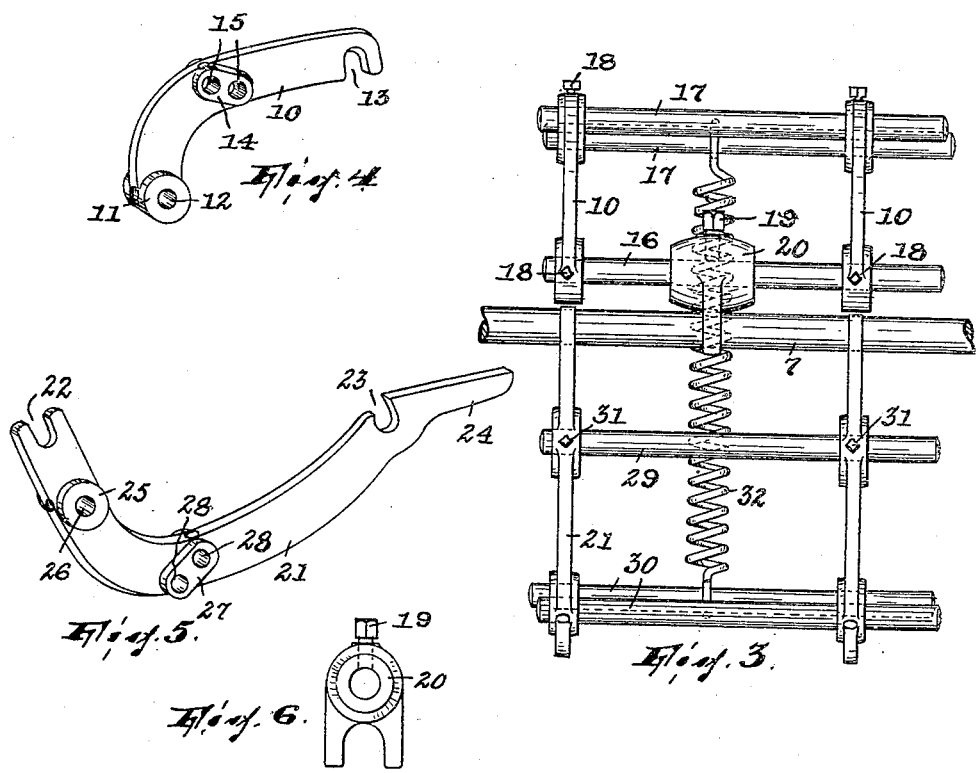
WITNESSES
INVENTOR
William E. Fischer,
BY
ATTORNEY

UNITED STATES PATENT OFFICE.

WILLIAM E. FISCHER, OF PATERSON, NEW JERSEY.

TAKE-UP MECHANISM FOR LOOMS.

931,745.  Specification of Letters Patent.  Patented Aug. 24, 1909.

Application filed March 11, 1908. Serial No. 420,302.

*To all whom it may concern:*

Be it known that I, WILLIAM E. FISCHER, a citizen of the United States, residing in Paterson, Passaic county, New Jersey, have invented a certain new and useful Improvement in Take-Up Mechanisms for Looms; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My present invention relates to take-up mechanisms for looms and it consists in certain improvements in a mechanism of this nature, which will be found set forth in U. S. Letters Patent No. 642,686, to C. and W. E. Fisher and G. F. Kuett, whereby various widths of rolls, and hence various widths of goods, may be accommodated in a manner calculated to make any change desired capable of being effected with convenience and at the same time retain the mechanism simple in construction and effective in operation.

While my invention is particularly adaptable to the patented construction above described, I do not wish to be limited to its application thereto.

In the accompanying drawing, Figure 1 is a side view of the improved mechanism; Fig. 2 is a view in front elevation; Fig. 3 is a view in rear elevation showing the brackets which carry the movable rolls and the shaft on which they are fulcrumed; and, Figs. 4, 5 and 6 illustrates details of said brackets.

The rotating shaft 1, the roll 2, the mechanism, comprising the hand wheels 3 and 4, whereby the roll 2 is mounted on the shaft so as to turn therewith but is capable of rotary adjustment thereon, as in the usual manner, the upper movable roll 5, the lower movable roll 6, and the shaft 7 affording a fulcrum for the brackets (to be described) which carry the rolls 5 and 6, are or may be all substantially the same in construction and relative arrangement as they are in the patented construction referred to.

The brackets which carry the rolls 5 and 6 and which are marked in Fig. 1 by the reference characters 8 and 9, respectively, may be described as follows: The upper bracket 8 comprises two bent arms 10 formed each at what constitutes, when the parts are properly assembled, its downwardly projecting end with a cylindrical enlargement or thickened-up portion 11 having a hole 12 extending therethrough and, at its other end, and on the under side, with an open bearing or recess 13. Between the recess 13 and the enlargement 11 said arm is formed with another thickened-up portion 14 penetrated by two holes 15 parallel with the hole 12. The two arms of the upper bracket 8, thus constructed, are connected together by the rod 16, extending through the holes 12, and by the rods 17 extending through the holes 15. 18 denotes set screws whereby the two arms may be secured any desired distance apart upon setting said screws against the rods 16 and 17. Between the arms 10 and on the rod 16 is secured adjustably by means of the set screw 19 the forked bearing piece 20. The lower bracket 9 comprises two bent arms 21 each formed at what constitutes its upwardly projecting end with a recess or open bearing 22 and near its other end on the upper side with a recess or open bearing 23; 24 is an extension forming a handle for manipulating the arm. In the upwardly projecting portion of the arm 21 is formed the cylindrical enlargement or thickened-up portion 25 having the hole 26; and at 27 is formed another enlargement or thickened-up portion having the holes 28 parallel with the hole 26. The two arms of the lower bracket 9, thus constructed, are connected together by the rod 29, extending through the holes 26, and by the rods 30 extending through the holes 28. 31 denotes set screws whereby the two arms may be secured any desired distance apart upon setting said screws against the rods 29 and 30. The brackets, thus constructed, are arranged as shown best in Fig. 1. Here the upper bracket 8 is fulcrumed on the shaft 7 by means of the bearing piece 20, its recesses or open bearings 13 receiving the trunnions 5′ of the roll 5; the lower bracket is likewise fulcrumed on the shaft 7, the recesses 22 of its arms 21 receiving the shaft 7 and the recesses 23 receiving the trunnions 6′ of the roll 6. The rolls 5 and 6 are held against the roll 2, in the relation shown, by the spring 32 one of whose ends is hooked over one of the rods 17 and the other of whose ends is hooked under one of the rods 30.

33 designates the goods, which extends first under roll 2, then around roll 5, then over the rod 17 which is not engaged by the spring, then under the rod 30 which is not engaged by the spring and then around the roll 6, on which latter it is wound. It will be observed that the rods 17 and 30 which are not engaged by the spring are disposed farther apart than the other two rods 17 and 30 so that the goods will clear the spring.

It will be obvious that my arrangement makes it unnecessary to keep on hand various sizes of the brackets in order to accommodate different widths of rolls and consequently of goods; all that it is necessary to do in order to adapt the brackets to varying widths of rolls is to loosen the set screws and move the arms of each bracket to or from each other until the desired distance is attained and then secure them in that position by the set screws. The upper bracket has a single bearing for allowing yielding to a displacing influence operating on one end of roll 5 more than on the other; it will be of course understood that the bearing piece 20 is adjusted whenever the arms are adjusted in order to bring it about midway between said arms.

Having thus fully described my invention, what I claim as new and desire to secure by Letters Patent is:

1. In a take-up mechanism for looms, the combination of the roll 1, the rolls 5 and 6 bearing against the roll 1, the fulcrumed brackets affording bearings for said rolls 5 and 6, and a spring connecting said brackets, said brackets comprising two rods affording means for attaching the spring to the brackets and two other rods disposed farther apart than said first-named rods and affording guides for the goods, substantially as described.

2. A fulcrumed roll sustaining bracket comprising two substantially parallel arms, a rod connecting said arms and an adjustable bearing piece arranged on said rod, and forming the fulcrum part of the bracket, substantially as described.

3. The combination, with the warp roll, of other rolls coöperative therewith, a fulcrum support, and brackets fulcrumed on said support and extending substantially in opposite directions therefrom and affording bearings, respectively, for said other rolls, each bracket comprising two substantially parallel arms, rods penetrating said arms and means for securing each arm to the rods for adjustment laterally, substantially as described.

In testimony, that I claim the foregoing, I have hereunto set my hand this 7th day of March 1908.

WILLIAM E. FISCHER.

Witnesses:
JOHN W. STEWARD,
WM. D. BELL.